Figure 1:
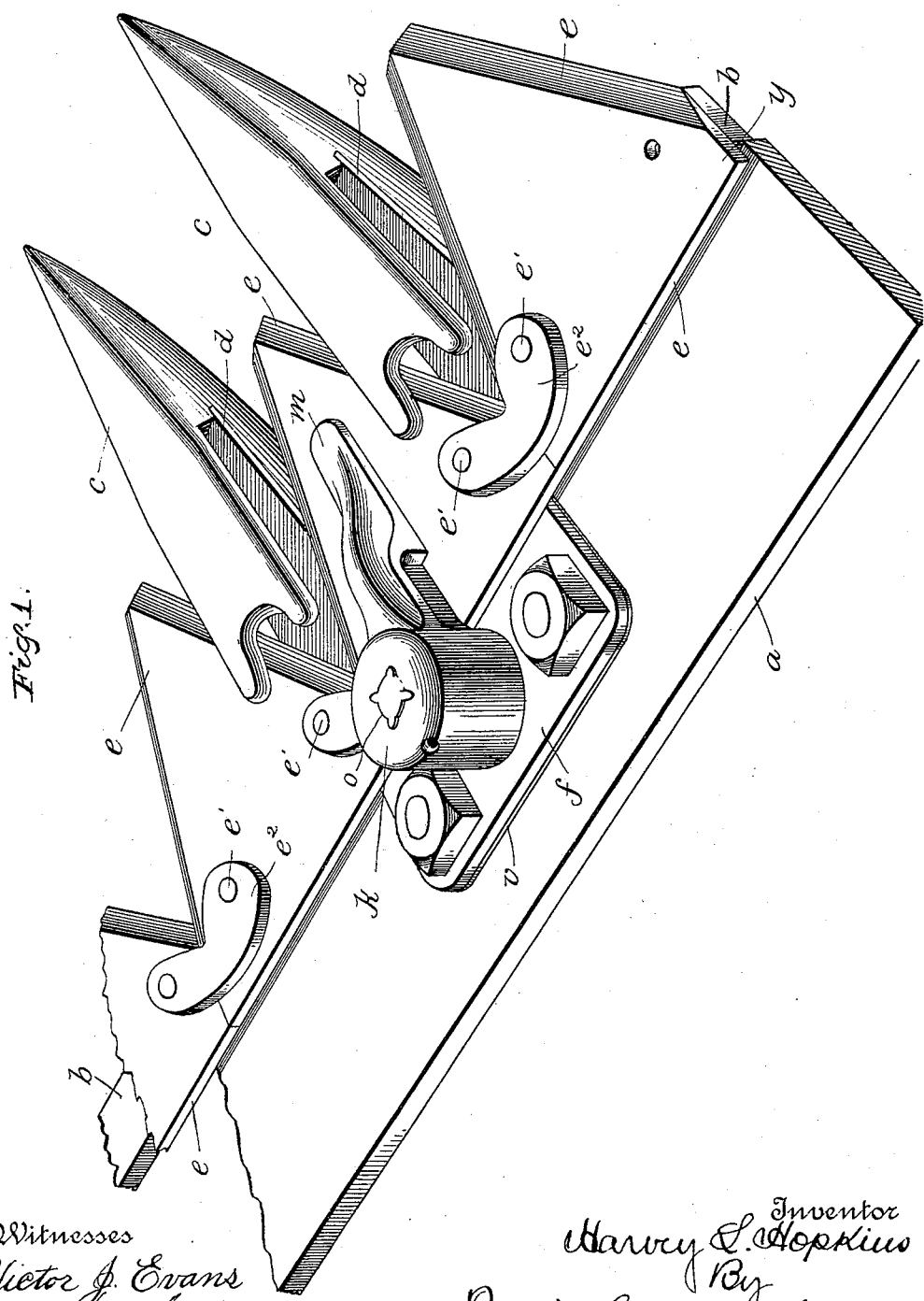

No. 640,768. Patented Jan. 9, 1900.
H. L. HOPKINS.
CAP FOR CUTTING APPARATUS FOR MOWERS AND REAPERS.
(Application filed Oct. 6, 1898.)
(No Model.) 2 Sheets—Sheet 1.

Witnesses
Victor J. Evans
J. E. Hutchinson Jr.

Inventor
Harvey L. Hopkins
By
Punier Goldsborough Attorneys

THE NORRIS PETERS CO., PHOTO-LITHO., WASHINGTON, D. C.

No. 640,768. Patented Jan. 9, 1900.
H. L. HOPKINS.
CAP FOR CUTTING APPARATUS FOR MOWERS AND REAPERS.
(Application filed Oct. 6, 1898.)
(No Model.) 2 Sheets—Sheet 2.
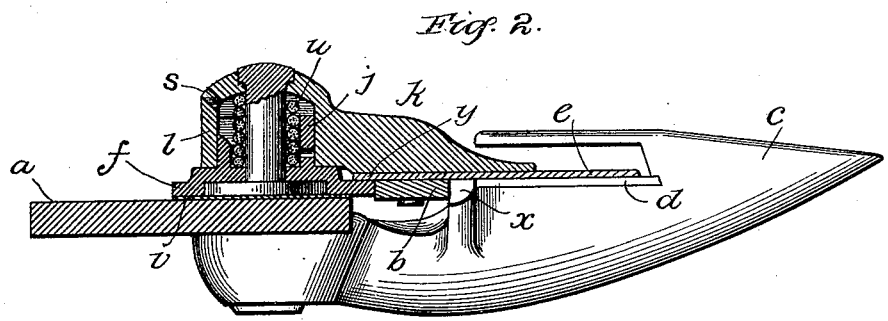
Fig. 2.
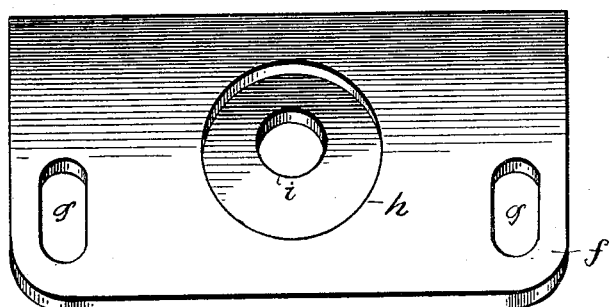
Fig. 3.
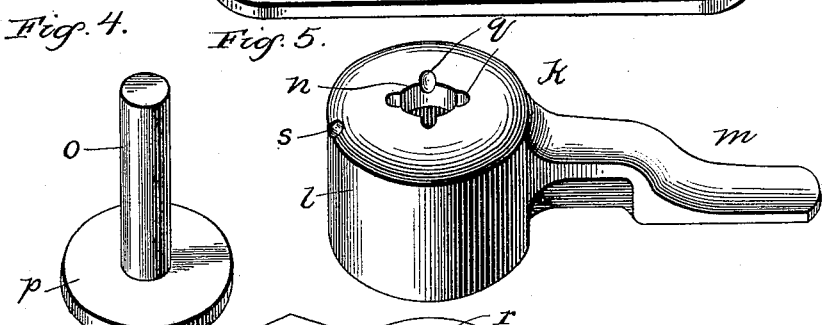
Fig. 4. Fig. 5.
Fig. 6.
Witnesses
Victor J. Evans
J. L. Hutchinson Jr.
Inventor
Harvey L. Hopkins
by
Renier Goldsborough Attorneys
THE NORRIS PETERS CO., PHOTO-LITHO., WASHINGTON, D. C.

UNITED STATES PATENT OFFICE.

HARVEY L. HOPKINS, OF MOLINE, ILLINOIS, ASSIGNOR OF TWO-THIRDS TO CHARLES H. POPE, OF SAME PLACE, AND MERWIN D. HOPKINS, OF WEST EATON, NEW YORK.

CAP FOR CUTTING APPARATUS FOR MOWERS AND REAPERS.

SPECIFICATION forming part of Letters Patent No. 640,768, dated January 9, 1900.

Application filed October 6, 1898. Serial No. 692,774. (No model.)

*To all whom it may concern:*

Be it known that I, HARVEY L. HOPKINS, a citizen of the United States, and a resident of Moline, county of Rock Island, State of Illinois, have invented certain new and useful Improvements in Caps for Cutting Apparatus for Mowers and Reapers; and I do hereby declare the following to be a full, clear, and exact description of the invention, such as will enable others skilled in the art to which it appertains to make and use the same.

It is well known by those skilled in the art that in the operation of mowing grass and cutting grain the blades or stalks tend to wedge in between the cutters and the plates on the guard-fingers and lift the cutters off the plates. This tendency varies with the kind and age of the grass or grain and the sharpness of the cutters and is increased by the natural sagging of the finger-bar between its ends. To overcome this difficulty and keep the cutters down so that their edges shall make a proper shear cut against the edges of the guard-plates, it is usual to secure on the finger-bar what are known as "cutter-caps," which overhang the cutters and keep them down in operative relation to the guards. Heretofore these caps have been secured to the finger-bar in fixed position, and there has been considerable friction between the cutters and the overhanging part of the caps and also a tendency for dirt, trash, and the lighter blades of grass, weeds, &c., to work in between the caps and the cutters and clog the same, thereby greatly adding to the friction between the parts. Increase of friction between the moving parts of course means an increase in the draft of the machine, and the constant rubbing of the cutters wears away the under sides of the caps, thus allowing the cutters to get farther away from the guard-plates until the shear cut is entirely destroyed, when it becomes necessary to hammer the caps down on the cutters to restore them to working relation.

The principal objects of my invention are to minimize this friction between the cutters and the caps and to prevent the clogging of the same by the accumulation of trash, dirt, grass, &c., between them, thereby reducing the draft of the machine, preventing the wearing away of the caps and more effectively holding the cutters down upon the guard-plates.

Minor objects are to improve the construction of the caps themselves, to furnish proper means for lubricating the parts, and to provide a combined guide for the cutter-bar and a support or chafe-plate for the rear edges of the cutters.

With these objects in view the invention consists, broadly, in a cutter-cap that moves with the cutters and in the hereinafter described and claimed details of construction whereby the cap is secured so as to permit such movement and whereby an oil-reservoir is provided for lubricating the cap, as well as in the arrangement for supporting and guiding the cutters and bar.

The invention is illustrated in the accompanying drawings, wherein—

Figure 1 is a perspective of a fragment of a cutting apparatus, showing one of my improved caps in operation. Fig. 2 is a longitudinal vertical section taken through the parts at the center of the cap. Fig. 3 is an under side perspective of the base-plate of the cap. Fig. 4 is a perspective of the rivet for holding the cap on the socket of the base-plate. Fig. 5 is a perspective of the cap proper, and Fig. 6 is a perspective of the base-plate looking at the top side.

Corresponding parts are denoted by the same letters in the several views.

Referring first to Figs. 1 and 2, $a$ is the finger-bar; $b$, the cutter-bar; $c$, the guards or fingers; $d$, the guard or ledger plates; $e$, the knives or cutters, and $e'$ the rivets which secure the cutters to the cutter-bar. These parts individually are of the usual construction, and their arrangement is also the ordinary one. The cutter-bar $b$ does not have its rear edge in contact with the front edge of the finger-bar $a$, but is located slightly above and in front of the latter, as best shown in Fig. 2, for the purpose of clearance.

Referring now more particularly to the remaining figures, the construction of the cap is as follows:

$f$ denotes a plate of any size and shape suitable for the purpose. This is the base-plate of the cap, and it has holes $g$ $g$, by means of which it may be bolted to the finger-bar, the holes being elongated to adapt the plate to be adjusted on the bar. On the under side the plate has a recess $h$, preferably circular, with a central opening $i$, leading into a tubular socket $j$, forming a stud, journal, or bearing on the upper side of the base-plate.

$k$ denotes the cap proper. It consists of a cylindrical hub or cap $l$, adapted to fit snugly on the stud-socket $j$ of the plate $f$, and a radially-projecting finger $m$, which extends over and bears upon the upper surface of the cutters $e$ when the cap is in place. The hub part is closed at the top except for a hole $n$, up through which projects the rivet by means of which the cap is held on the stud-socket. This rivet is denoted by $o$, and it has a head $p$, which fits in the recess $h$ on the under side of the base-plate, so that the stem projects upwardly into the socket-stud $j$ and out through the hole $n$ in the top of the cap $l$ when the latter is in place on the stud-socket. This socket, as will now be understood, forms a pivot or journal for the cap to turn on. The rivet not only secures the cap to the base-plate, so that it may oscillate on its pivot $j$, but the broad head of this rivet forms a substantial bearing which receives and resists the upward thrust of the cutter-cap when in operation. In assembling the parts the rivet is inserted from the under side of the plate, and after the stud has been covered with the cap the end of the rivet is hammered down or upset to hold the parts permanently together. It is intended that the rivet shall oscillate with the cap, and it is therefore fitted to turn in the recess $h$ and the socket $j$, and there are a number of little indentations $q$ around the hole in the cap $l$, into which the upset metal of the rivet will seat, and thereby unite the rivet fixedly to the cap, so as to turn therewith.

On referring to Figs. 2 and 6 it will be noticed that the bore of the socket is considerably larger than the diameter of the rivet. The object of this is to form the socket into a reservoir or space $r$ for oil, by means of which I provide proper lubrication for the cap. In the top of the hub $l$ of the cap I provide an opening $s$ for the introduction of the oil, and I preferably cut away the rear wall of the socket, as in Fig. 6, so as to facilitate the entrance of the nozzle or spout of the oil-can. As shown in Fig. 2, there is also an exit-opening for the oil to pass from the socket or reservoir $r$ outwardly to the interior surface of the cap-hub $l$ and to lubricate the bearing between the two. The perforation $i$, up through which the rivet extends, is intended to fit the rivet rather loosely, so that the oil may pass downward and lubricate the bearing between the large rivet-head $p$ and the recess $h$. In order to provide against the escape of the oil downward and onto the finger-bar, I place a gasket or washer $v$, of paper or other material, between the under side of the base-plate and the finger-bar. I have also shown the interior of the socket $j$ filled with wicking $w$ or other fibrous absorbent material; but this is not an essential provision.

As before stated, the cutter-bar is located a little above and in front of the finger-bar, as shown in Fig. 2, instead of being down on a level with it and working against its forward edge. This permits me to utilize the base-plate of the cap to obtain an adjustable raceway for the cutter-bar. As shown in Fig. 2, the cutter is about on a level with the plate $f$, with the front edge of the plate bearing against it, and the plate being adjustably secured to the finger-bar it is obvious that it may be set forward as wear occurs, so as to keep the cutter-bar snugly up against the shoulders $x$ of the guards. The location and arrangement of the cutter-bar in this way enable me also to make use of the base-plate of the cap as a support for the cutter-bar and a chafe or wear plate for the same and the cutters. This is clearly shown in Fig. 2, where $y$ denotes the rear edge of the cutters extending beyond the bar $b$ and overlying the front edge of the plate $f$.

Such is the construction and operation of my improved cap. It will be understood that as the cutters reciprocate through the guards they cause the cap to oscillate on the stud and that instead of the cutters sliding under the cap the cap actually follows the cutters and moves with them, practically standing still with respect to them and holding them constantly in snug contact with the ledger-plates. Obviously this almost wholly does away with sliding friction and also prevents dirt, trash, weeds, and grass from being drawn in between the cap and the upper surface of the cutters.

In order to prevent any possible accidental disengagement of the cap from the cutters or to provide against its turning so far around as not to return promptly on the opposite stroke of the cutters or so as possibly to leave the cutters altogether, I provide abutments or projections on the cutters, on each side of the cap, to limit the extent of movement of the cap. I prefer to make these abutments by extending upwardly the rivets $e'$, by which the cutters are secured to the cutter-bar. In the construction shown in the accompanying drawings the upward extensions of these rivets are utilized to secure to the cutters certain link-plates $e^2$, which span the joints between the cutters and stiffen and strengthen them, and the cap would actually contact with these plates. The plates, however, form no part of the present invention and, so far as their function in preventing the cap from getting off the cutters is concerned, may be considered as mere abutments or projections from the cutters.

I have herein shown the caps as secured to the finger-bar; but obviously the only essential thing is that they should be secured to some part that has a fixed relation to the cutter-bar. I do not, therefore, desire to limit my claims to the particular location for the caps that is shown and described herein.

What I claim, and desire to secure, is—

1. In a cutting apparatus for mowers and reapers, the combination of the finger-bar, the cutter-bar, and a cap adapted to hold the cutters down in operative relation to the guards, said cap being arranged to move with the reciprocations of the cutter-bar.

2. In a cutting apparatus for mowers and reapers, the combination of the finger-bar, the cutter-bar, and a cap secured to the finger-bar and operating to move with and hold the cutters down in operative relation to the guards.

3. In a cutting apparatus for mowers and reapers, the combination of the finger-bar, the cutter-bar, and a cap pivotally secured to the finger-bar and having its free end overlapping and bearing on the cutters to hold them down in operative relation to the guards, said cap being adapted to be vibrated by the reciprocating cutters.

4. In a cutting apparatus for mowers and reapers, the combination of the finger-bar, the cutter-bar, and a cap pivotally secured to the finger-bar and having its free end overlapping and bearing on the cutters to hold them down in operative relation to the guards, said cap being adapted to be vibrated by the reciprocating cutters, and the cutter-bar being provided with means for engaging the cap and preventing it from moving off the cutters.

5. The combination in a cap for the cutting apparatus of mowers and reapers, of the plate $f$, having the upstanding socket $j$, the vibrating cap $k$, fitting said socket and the rivet $o$.

6. The combination, in a cap for the cutting apparatus of mowers and reapers, of the plate $f$, having the upstanding socket $j$, the vibrating cap $k$, fitting said socket, and the rivet $o$, the latter being smaller than the interior of the socket so as to leave an oil-space between them.

7. The combination, to form a cap for the cutting apparatus of mowers and reapers, of the plate $f$, having the recess $h$ on its under side, and the upstanding tubular socket $j$ on its upper side, the vibrating cap $k$ fitting on said socket, and the rivet $o$ having the head $p$ fitting the recess in the under side of the plate, said rivet extending up through the socket and being adapted to hold the cap thereon.

8. The combination in a cap for the cutting apparatus of mowers and reapers, of a base-plate adapted to be secured to the finger-bar, an upstanding socket on the plate, and a vibrating cap pivoted on the socket and overhanging the cutters, the socket being constructed to provide an oil-space for lubricating the cap.

9. In a cutting apparatus for mowers and reapers, the combination of the finger-bar, the cutter-bar, a cap pivoted on the finger-bar and overhanging the cutters, and projections above the cutters on either side of the cap to prevent its disconnection from the cutters.

In testimony whereof I affix my signature in presence of two witnesses.

HARVEY L. HOPKINS.

Witnesses:
CHARLES H. POPE,
A. E. MONTGOMERY.